Dec. 3, 1957     T. A. WEISZ     2,815,429
DEVICE FOR MELTING ADHESIVE
Filed Dec. 10, 1954
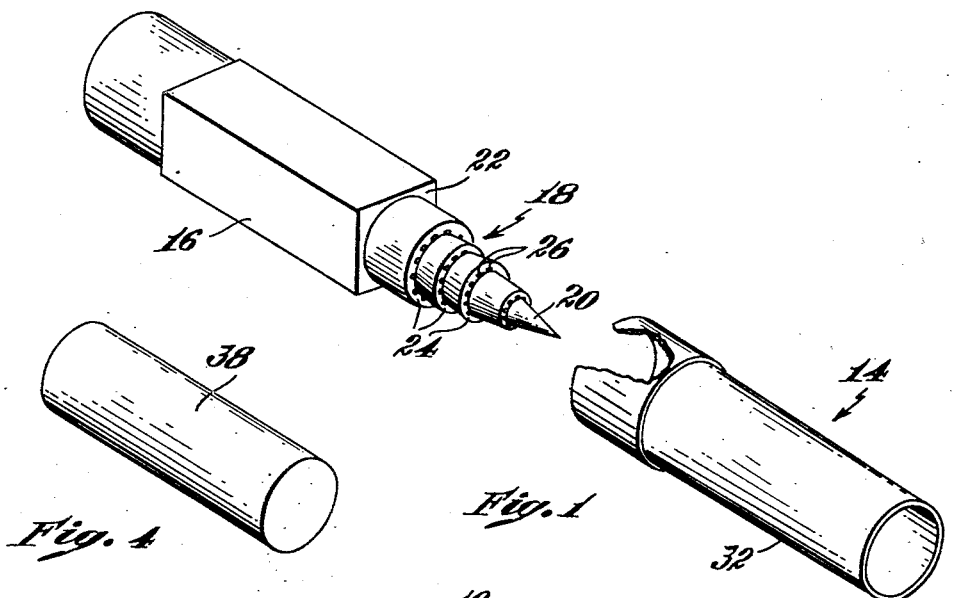
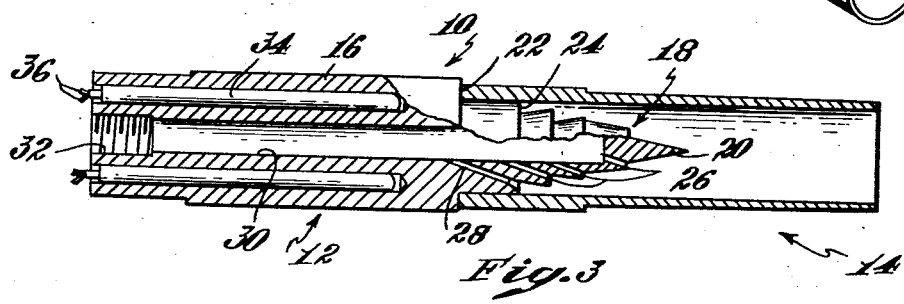
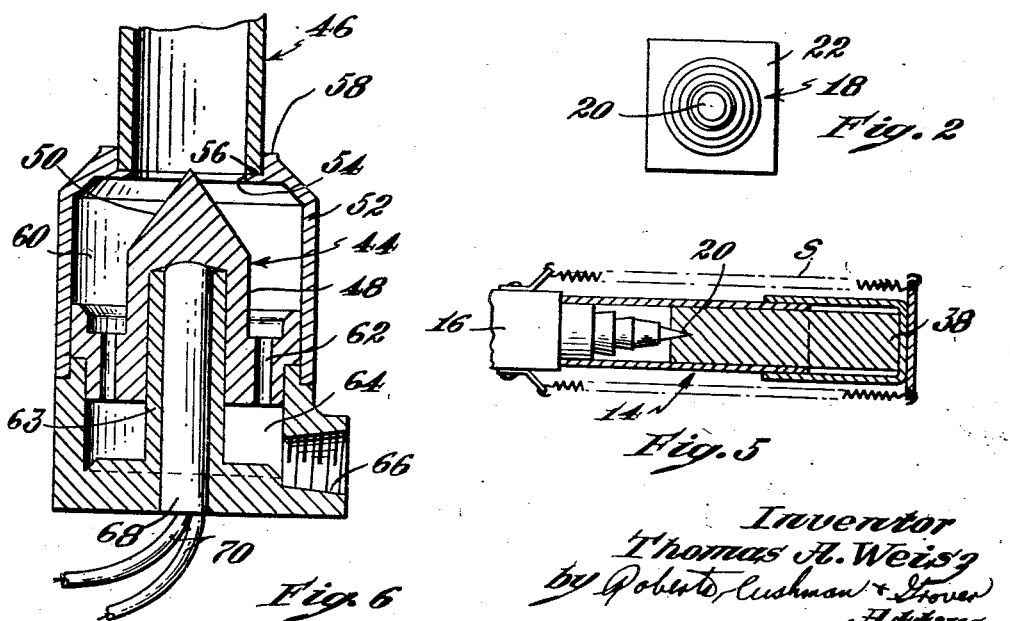
Inventor
Thomas A. Weisz
by Roberts, Cushman & Grover
Attys United States Patent Office 2,815,429
Patented Dec. 3, 1957

2,815,429
DEVICE FOR MELTING ADHESIVE

Thomas A. Weisz, Plymouth, Mass., assignor, by mesne assignments, to Jacob S. Kamborian, West Newton, Mass.

Application December 10, 1954, Serial No. 474,469

4 Claims. (Cl. 219—21)

This invention relates to adhesives and more especially to a method of and apparatus for melting thermoplastic adhesives.

Because of certain additives incorporated in thermoplastic adhesives for the purpose of improving their adhesive characteristics, melting the adhesives in the presence of air results in formation of an oxide scum which accumulates excessively on the apparatus, which blocks up applicators employed for spreading the cement rendering them unfit for use, which is a deterrent to smooth spreading of the adhesive and which is wasteful of the adhesive.

The principal objects of this invention are therefore to provide an apparatus for melting adhesive with a minimum of oxidation during melting and after it is melted. Other objects are to provide means for melting small quantities of adhesive at a time so that only as much as is required at any given time is in liquid form, the remainder being left in a solid form and hence less liable to oxidation. Another object is to melt only a part of the adhesive at any given time and use the unmelted portion of the adhesive as a piston to exert fluid pressure on the melted portion, thus forcing the melted adhesive to its place of use. Another object is to provide a simple inexpensive device with which to supply heat more efficiently and more rapidly to solid adhesive with much faster melting thereof than has heretofore been done.

As herein illustrated, the adhesive is supplied in solid form and is melted by pressing it against a heated support to melt the adhesive exclusively at the interfacial contact of the adhesive and the support. Preferably the support has a sharp point which progressively penetrates the mass of the solid adhesive as it melts the adhesive at the interfaces. The support is enclosed within a hollow chamber having an entrance through which the adhesive may be fed toward the support, the latter being centered therein with respect to the entrance. The entrance to the chamber has a cross section which corresponds substantially to that of the support and is adapted to receive and support a body of solid adhesive of corresponding cross section which thereby seals the entrance. In one form of the device the heated support which is heat conductive has a shank, a tapering head and a radial shoulder at the junction of the head and shank. In this form the chamber is a hollow sleeve which fits snugly over the head against the radial shoulder and corresponds in inside diameter to the base of the head. The sleeve supports within it a solid stick of adhesive of corresponding section with its lower end pressed against the tapering end of the head. A heating element is embedded in the shank for supplying heat to the support and as the adhesive melts the stick slides downwardly in the sleeve or is forced therealong by suitable means, the stick being loosely contained in the sleeve and free to move relative thereto. The point has in it a plurality of ports connected with a passage therein leading from the point to a place remote therefrom. In another form of the device the hollow chamber has lower and upper portions, the lower portion being of larger diameter than the lower part of the support and having a top opening concentric with the support and the upper portion which corresponds to the diameter of the support being constituted by a non-heat conductive sleeve snugly fitting into a socket at the top opening. The lower part of the chamber provides an annular well about the support for receiving melted adhesive formed at the point. The wall of the chamber at the lower part of the well is provided with a drain nipple through which adhesive may be supplied to a place of use.

In both forms of the device the adhesive in the non-conductive sleeve remains solid except for the lower end which has contact with the heated point and hence acts as a stopper or closure sealing the zone of melting from the air and additionally prevents entrance of air to the well into which the adhesive flows after melting. The unmelted adhesive also acts as a piston, applying pressure to the melted adhesive when force, gravitational or other, is applied to the unmelted end.

In accordance with the method the adhesive is melted in such fashion as to minimize oxidation of the adhesive by advancing a solid body of adhesive through an embrasure of corresponding cross section into a melting zone, supplying heat exclusively to the end face of the leading end of the adhesive within the enclosure as it is advanced thereinto while maintaining the embrasure sealed with the unmelted adhesive behind the leading end and drawing the melted adhesive off as fast as it is formed. Withdrawal of the melted adhesive is effected partly by gravity and partly by pressure supplied by the weight of the unmelted adhesive.

The invention will now be described in greater detail with reference to the accompanying drawings wherein:

Fig. 1 is a perspective view of the device with its parts separated axially;

Fig. 2 is an end view of the head of the heat conductive element;

Fig. 3 is a diametrical section of the device with the parts assembled;

Fig. 4 is a perspective view of a stick of adhesive;

Fig. 5 is a fragmentary section of the device showing means associated with the non-conductive sleeve for applying pressure to the stick of adhesive; and Fig. 6 is an elevation partly in section of an alternative form of the device.

Referring to Figs. 1 to 4 inclusive, the device 10 is comprised of a heat conductive element 12 for melting adhesive and a non-conductive element 14 for supporting the adhesive in contact with the heat conductive element. The heat conductive element has a shank 16 and a head 18 which tapers to a sharp point 20. At the junction of the head with the shank there is a lateral shoulder 22. The tapering head is not uniform but consists of a stepped series of cylindrical portions of decreasing diameter from base to tip. At the junctions of the cylindrical portions of different diameter there are radial shoulders 24. In each of the shoulders 24 there are a plurality of ports 26 opening into inwardly inclined passages 28 which converge toward and are connected to a common axial passage 30 in the body of the shank which extends from the head rearwardly to the end of the shank. The terminal end of the passage may be threaded as at 32 to receive a correspondingly threaded nipple on the end of a conduit for conducting the melted adhesive wholly protected from exposure to the air directly to a place of use.

Within the body of the shank 16 there is incorporated one or more resistance coils 34 from which extend suitable leads 36 for supplying current thereto and hence for supplying heat to the unit. The body of the shank is partly circular and partly rectangular in cross section; however, it is to be understood that the particular cross section illustrated is of no significance; moreover, the tapering head may if desired be smoothly conical or pyramidal without departing from the spirit of the invention. Preferably the element is made of metal which has good conductive properties, for example, iron, steel or copper.

The non-conductive cement holder 14 is in the form of a hollow sleeve 32 open at its opposite ends and has an inside diameter 34 which corresponds in diameter to the base of the point so that it may be slipped over the end of the point and seated against the shoulder 22, as shown in Fig. 3. By dimensioning the parts so that they fit snugly, their frictional engagement will suffice to hold them together in operative position and yet will permit them to be easily separated for cleaning. The wall at the lower end of the sleeve may be thickened somewhat to provide a better bearing surface and to strengthen it. The sleeve may be made of paper board, plastic or any other material which is non-conductive of heat and preferably seamless.

The sleeve 14 is adapted to receive a stick of solid adhesive 38 (Fig. 4) of slightly smaller diameter than that of the sleeve and to hold it upright against the pointed end of the head when the device is used in an upright position. In this upright position the weight of the adhesive itself will suffice to cause it to settle downwardly within the sleeve over the heated pointed head as the latter melts adhesive from the lower end of the stick and also to provide the pressure necessary to force the liquid adhesive through the ports to the extreme end of the shank. If it is inconvenient to use the device in a vertical position so that gravity cannot be depended upon to supply the force necessary to move the stick toward the head as it is melted, or if in the vertical position gravity is not sufficient to obtain the flow rate desired, one or more springs s or equivalent means, such as shown in Fig. 5, may be used to apply pressure to the end of the stick by way of a cap applied to the end of the stick.

In operation when heat is supplied to the shank 16 and consequently to the head 18, the tip of the point 20 will first melt the adhesive at the exact center of the lower end of the stick of adhesive. The melted adhesive will flow downwardly over the point within the sleeve through the ports in the point into the central passage and from thence to a place of use. As melting takes place more of the point is admitted into the end of the stick so that melting takes place progressively from its lower end to its upper end and progressively from its center outwardly. Since the melting takes place entirely within the substance of the adhesive stick which itself is a poor heat conductor and the outer surface of the stick is surrounded with a sleeve 14 which is non-conductive of heat thereby preventing transfer of heat from the heat conducting element to the surface of the stick, the outer portion of the stick above the point remains solid and hence provides a stopper or closure for the open upper end of the sleeve sealing it up to the time that the unmelted portion of the stick becomes so short as to be penetrated by the pointed end of the head and thus completely melted. Thus throughout melting an airtight chamber is always maintained at the melting zone which excludes air therefrom and thus prevents any oxidation during or after melting. Moreover as fast as the melted adhesive is formed it passes directly through the ports 26 in the point into the central passage 30 and from thence by means of a conductor or other means connected to the lower end of the unit to a place of use without exposure to air. Since the unmelted portion of the adhesive acts as a piston, gravity or force on the unmelted end exerts pressure on the melted portion, thus forcing it through the ports and passages 30.

If the device is used in a horizontal position the pressure necessary to force the melted adhesive along the passage 30 will of course be supplied by supplemental means as for example, the pressure applying means at the end of the sleeve shown in Fig. 5.

An alternative form of device is shown in Fig. 6 consisting of a heat conductive element 44 and a non-conductive support 46 for holding a stick of adhesive in contact therewith. The heat conductive element 44 has a shank 48 and a uniformly tapering point 50 and is located within a chamber 52 which has at its upper end an opening 54 surrounding which is a ledge 56 and a flange 58. The heat conductive element is concentric with the opening 54 and its point 50 is located within the opening. The upper part of the heat conductive element is smaller than the inside diameter of the chamber so that an annular well 60 surrounds the element forming a catch basin for the adhesive. The heat conductive element is hollow and is supported on a hollow post 63 extending upwardly from the bottom of the chamber above the bottom thus leaving an annular chamber 64 at the base thereof which is ported at 66. A plurality of vertical passages 62 lead from the bottom of the well through the lower end of the heat conductive element into the chamber 64. A heating unit 68 is inserted through the bottom of the chamber into the inside of the hollow post and is supplied with current by conductors 70.

The non-conductive support 46 for the adhesive stick consists of a cylindrical sleeve having an outside diameter corresponding to the inside diameter of the flange 58 and an inside diameter corresponding to that of the opening 54. The sleeve is assembled with the heating element by fitting its lower end into the flange against the shoulder 56. Frictional engagement of the parts will suffice to hold them in operative position and yet will permit them to be separated for cleaning. As in the form illustrated in Figs. 1 to 3, the sleeve is made of a non-conductive material such as paper board, or plastic.

In use a stick of solid adhesive is slipped into the sleeve 46, heat is supplied to the heat conductive element 44 and the stick will gravitationally settle over the point 50 as the point penetrates thereinto or if necessary it may be forced as a piston. The melted adhesive may be drawn off through the ports 66 by way of a suitable conduit to applicator rolls or nozzles or the like.

When the adhesive contacts the heated point a slight spreading takes place forcing the outer periphery of the stick into contact with the shoulder 56 forming an airtight seal and thus preventing access of air to the melting zone at the top. Air is also excluded from the well and the chamber therebelow so that the melted adhesive is also kept out of contact with air until it is delivered to its place to use.

It should be understood that the present disclosure is for the purpose of illustration only and that this invention includes all modifications and equivalents which fall within the scope of the appended claims.

I claim:

1. A device for melting thermoplastic adhesive comprising a heat conductive unit having a pointed end which has stepped portions of diminishing area from its base to its tip, a non-conductive sleeve adapted to be slipped onto the unit over the point and to be supported thereby in a substantially vertical position and in turn to support a stick of adhesive with its lower end bearing on the point, means for supplying heat to the heat conductive unit, and means associated with the point for conducting the melted adhesive away from the zone of melting.

2. A device for melting thermoplastic adhesive comprising a heat conductive unit having a pointed end which has stepped portions of circular cross-section diminishing in diameter from its base to its tip, which provide a plurality of radial shoulders, a non-conductive sleeve adapted to be slipped onto the unit over the point and to be supported thereby in a substantially vertical position, and in turn to support a stick of adhesive with its lower end bearing on the point, means for supplying heat to the heat conductive unit, and a plurality of passages located along said radial shoulders for conducting the melted adhesive away from the point.

3. A device for melting thermoplastic adhesive comprising a hollow chamber having a bottom, walls and a top in which there is a circular opening of predetermined cross section, a flat radial ledge bounding the opening, an annular flange skirting the ledge, a hollow post rising from the bottom of the chamber which is of smaller diameter than the inside diameter of the chamber, a tubular heat conductor having a solid point telescopically engaged with the post and supported thereby within the chamber with its pointed end within the circular opening and its lower end elevated from the bottom of the chamber, the lower part of the conductor element corresponding in diameter to the chamber, a plurality of vertical passages through the lower end of the conductor element connecting the space above its lower end with the space beneath its lower end, a draw off nipple in the wall of the chamber below the conductor element, a resistance coil housed within the hollow post and a non-conductive sleeve seated against the ledge within the annular flange.

4. A device for melting thermoplastic adhesive comprising a hollow elongate sleeve of non-conductive material open at its ends for slidably receiving a stick of solid adhesive for progressive melting of one end thereof by gravitational descent of that end as it is melted, a support for said end of the sleeve removal cooperable therewith to hold the sleeve upright, said support mounting a heat conductive unit which has an upwardly projecting pointed end for engagement with the lower end of the stick, means for supplying heat to the heat conductive unit, a chamber below the point of the heat conductive unit for receiving the melted adhesive, said chamber being in communication with said sleeve to allow adhesive melted at the point to flow downwardly into the chamber, means providing a substantially hermetical seal between the lower end of the sleeve and the support to exclude air from the zone of melting, and a port in the support through which the melted adhesive may be drawn off for use.

References Cited in the file of this patent

UNITED STATES PATENTS

| | | |
|---|---|---|
| 475,442 | Cuttriss | May 24, 1892 |
| 979,905 | Wallmann | Dec. 27, 1910 |
| 1,129,900 | Proctor | Mar. 2, 1915 |
| 1,381,500 | Reader | June 14, 1921 |
| 1,619,817 | Gibson | Mar. 8, 1927 |
| 2,118,415 | Pesark | May 24, 1938 |
| 2,272,780 | Schweyer | Feb. 10, 1942 |
| 2,516,950 | Bragg | Aug. 1, 1950 |

FOREIGN PATENTS

| | | |
|---|---|---|
| 97,708 | Germany | June 23, 1898 |